Nov. 19, 1940.                J. KRAL                2,222,147

SNAP FASTENER STUD

Filed April 1, 1939

Inventor:
Joseph Kral.
by Walter S. Jones
Att'y.

Patented Nov. 19, 1940

2,222,147

UNITED STATES PATENT OFFICE 2,222,147

SNAP FASTENER STUD

Joseph Kral, Cambridge, Mass., assignor to United-Carr Fastener Corporation, Cambridge, Mass., a corporation of Massachusetts Application April 1, 1939, Serial No. 265,532

2 Claims. (Cl. 24—73)

My invention aims to provide improvements in snap fastener members particularly snap fastener so-called hook-on studs for use in upholstering of vehicle bodies.

In the drawing which illustrates a preferred embodiment of my invention:

Figure 1:
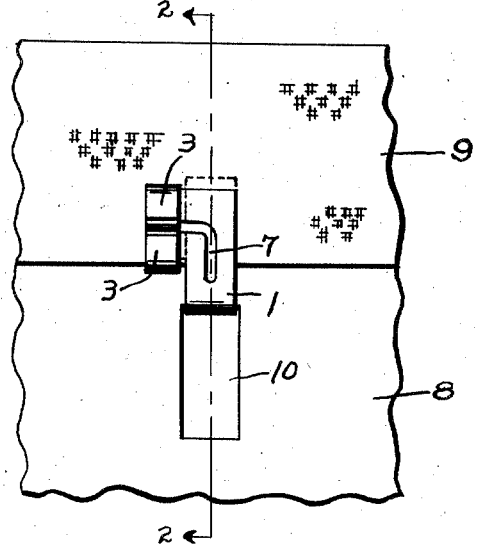
Figure 1 is a plan view of a portion of an upholstery panel showing the manner in which my improved fastener stud is attached thereto.
Figure 2:
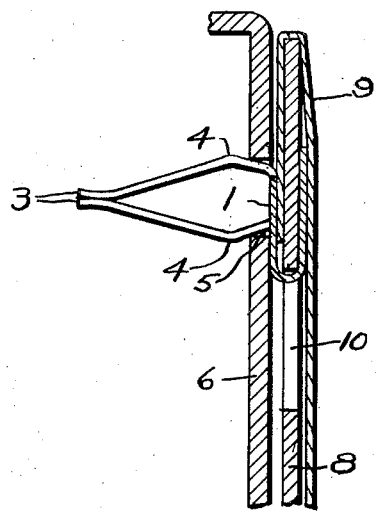
Figure 2 is a section taken on the line 2—2 of Figure 1.
Figure 3:
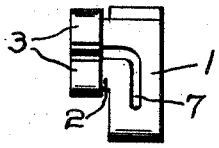
Figure 3 is a plan view of the stud member per se.
Figure 5:
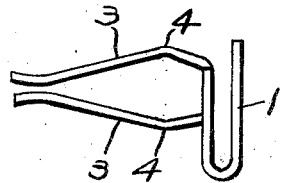
Figure 5 is an edge view of the stud.
Figure 4:
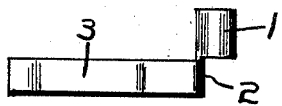
Figure 4 is an end view of the stud member per se.
Figure 6:
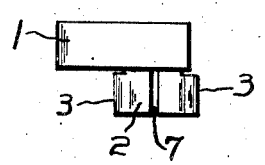
Figure 6 is a bottom view of the stud.

Referring to the embodiment of my invention selected for illustrative purposes, I have shown a fastener which is made from a single piece of sheet metal and has a base 1 which may be of any suitable construction but in the drawing is shown as U-shaped (Figs. 2 and 5). The stud is preferably provided with a side extension 2 connected to one edge of the top portion of the base 1 (Figs. 1 and 4) and a shank is provided in the form of a pair of yieldable leg portions 3—3 facing each other flatwise and each being connected to an opposite edge of the extension 2. Each leg is bowed so that together they extend from the extension for a portion of their distances in a diverging relationship, as shown in Figs. 2 and 5, and then they converge toward their free ends thus providing shoulder portions 4—4 for snap fastening engagement through an aperture 5 in a suitable stud-receiving means such as the metal portion 6 which may be part of the door of an automobile, as shown in Fig. 2.

One of the faults with the type of stud member shown, where the legs are connected to the base and their ends are free, has been in the fact that there has not been sufficient resiliency in the legs adjacent to where they connect with the base to provide a strong holding power and an adequate take-up for various thicknesses of metal. My improved fastener overcomes this fault to a large extent because I have provided a slit 7 which divides the extension 2 between the legs 3—3 and preferably extends into the top face of the base 1 substantially as shown in Figs. 1 and 2. This slit provides a great deal of resiliency in the base and in the extension so that there can be considerable movement of the portions of the extension and the base adjacent the slit 7 thereby permitting greater movement and more elasticity to the legs 3—3 especially where they join the extension 2.

The particular type of stud which I have selected for illustration of my invention having a U-shaped or hooked base 1 is particularly adapted for attachment to a panel of well known construction including the cardboard base 8 covered with upholstery material 9 and provided with elongated apertures 10 through which the base 1 of the stud is hooked into engagement with the cardboard 8, as shown in Figs. 1 and 2.

My improved fastener stud is relatively simple in construction and quite easy to manufacture but the provision of the slit in the base, especially in the type of construction of fastener shown, is, in my opinion, a distinct advance in the art because it permits the use of this type of fastener in installations where heretofore unsatisfactory results were had when that type of fastener was attempted to be used.

While I have illustrated and described a preferred embodiment of my invention, I do not wish to be limited thereto because the scope of my invention is best defined by the following claims.

I claim:

1. A sheet metal snap fastener adapted to be connected to an apertured support comprising a base having substantially parallel faces, one of said faces being provided with an angular slot, dividing said face into juxtaposed portions, a lateral extension connected to each of said portions on one side of said face, a bowed leg member connected to each of said extensions and extending therefrom in a plane normal to but displaced laterally from said face, said leg members being oppositely disposed in cooperative relationship to provide a resilient stud member for snap fastening engagement with an apertured support.

2. A sheet metal snap fastener adapted to be connected to an apertured support, comprising a base having substantially parallel faces, one of said faces being provided with an L-shaped slot extending from one side thereof and dividing said face into juxtaposed side portions, a lateral extension connected to each of said side portions on one side of said face, a bowed leg member connected to each of said extensions and extending therefrom in a plane normal to but laterally displaced from said face, said leg member being oppositely disposed in cooperative relation to provide a resilient stud member for snap fastening engagement with the apertured support.

JOSEPH KRAL.